United States Patent [19]

Sant'Agostino et al.

[11] Patent Number: 5,297,168
[45] Date of Patent: Mar. 22, 1994

[54] SPACE-DIVERSITY DIGITAL MOBILE RECEIVER AND RELEVANT PROCESS

[75] Inventors: Marcello Sant'Agostino, Milan; Luigi Moreno, Torino; Renato D'Avella, Milan, all of Italy

[73] Assignee: Italtel Societa Italiana Telecommunicazioni s.p.a., Milan, Italy

[21] Appl. No.: 777,399

[22] PCT Filed: Apr. 11, 1990

[86] PCT No.: PCT/EP90/00603

§ 371 Date: Jan. 31, 1992

§ 102(e) Date: Jan. 31, 1992

[87] PCT Pub. No.: WO90/16118

PCT Pub. Date: Dec. 27, 1990

[30] Foreign Application Priority Data

Jun. 15, 1989 [IT] Italy .................... 20880 A/89

[51] Int. Cl.$^5$ ............................................. H04B 7/08
[52] U.S. Cl. ............................ 375/100; 375/11; 375/40; 455/132; 455/135
[58] Field of Search ............... 375/100, 102, 11, 14, 375/15, 40; 455/137, 138, 132, 296, 135

[56] References Cited

U.S. PATENT DOCUMENTS

| | | | |
|---|---|---|---|
| 4,328,585 | 5/1981 | Monsen | 375/14 |
| 5,031,193 | 7/1991 | Atkinson et al. | 375/100 |
| 5,065,411 | 11/1991 | Muto | 375/100 |
| 5,109,392 | 4/1992 | McDonald | 375/100 |
| 5,127,025 | 6/1992 | Okanoue | 455/135 |

OTHER PUBLICATIONS

AT&T Teh. Journal. vol. 64. No. 4, Apr. 1985. (N.Y. U.S.) "A Simulation Study of Space Diversity and Adaptive Equalization in Microwave Digital Radio" pp. 907-935 L. J. Greenstein et al P. Minsen.

IEEE Comm. Magazine vol. 18. No. 1, Jan. 1980 (N.Y. U.S.) "Adaptive Processing Can Reduce the Effects of Fading on Beyond the Horizon Digital Radio Links" pp. 16-25.

Primary Examiner—Curtis Kuntz
Assistant Examiner—T. Ghebretinsae

[57] ABSTRACT

In a radio mobile system in which the radio signals are received by at least two antenna, the signals are filtered, weighted and then combined before being sent to an equalizer. The weighting coefficients are calculated as a function of signals corresponding to the power level received by each antenna and signals which is represent the quality of reception of each antenna. Furthermore, an equalizer control signal is generated from the combination of signals, weighted by the weighting coefficients, corresponding to the time response of the transmission channel to a single impulse.

27 Claims, 3 Drawing Sheets

SPACE-DIVERSITY DIGITAL MOBILE RECEIVER AND RELEVANT PROCESS

DESCRIPTION

In a preferred embodiment of the invention, a process for the equalization, or else the correction of the distortions respectively in phase and/or amplitude, of time-division digital signals in a radio mobile system, in which the radio signals are received by at least two antennae is disclosed.

Furthermore the invention refers to a signal receiving device in radio mobile systems, specifically an adaptive receiver of the type providing for the combination of the signals received by two or more antannae for time-division digital communication, in particular for a digital radio mobile system.

BACKGROUND OF THE INVENTION

In a digital radio mobile system, the signal of a user is coded in digital form and the information relating to a certain number of users, for instance eight users, is multiplexed with time division, forming a frame where each user is assigned a time slot containing a train of bits (burst).

The signal thus formed will modulate the phase of a carrier wave, for instance with a constant envelope modulation or GMSK (Gaussian Minimum Shift Keying) phase modulation and each radio mobile receiver will extract only the relevant information from this flow.

The signals received in a radio mobile system show some distortions due to different causes such as propagation through multiple paths, Doppler effects, local oscillator drifts. These phenomena are emphasized further on in the event of digital signals having a relatively wide band, in the order of 200 KHz each channel. The receiver therefore is to provide for an equalization of the signal received in order to improve the quality of the communication.

According to the known technique, such equalization may be obtained by a transversal filter, with or without decision feedback, or else with a Maximum Likelihood Sequence Estimate (MLSE) utilizing a matched filter and a Viterbi processor. In lack of a proper equalization, the quality of the communication may be compromised even if the signal received is powerful enough.

On the other hand, the equalization techniques require certain power values in the signal received for their correct operation, while there is the need of keeping the transmission power within certain limits for various reasons, e.g. to prevent interferences between the various areas and to minimise the consumption and the dimensions of the mobile terminals. When the received signals have a power below the threshold value of the correction system, this is not able any longer to satisfactorily reconstruct the signal, thus causing a deterioration in the quality of the received signal.

It has been suggested that these inconveniences could be avoided by using space diversity techniques in digital radio mobile systems i.e. by using two or-more signals received from the same number of antennae positioned in such a way as to make these signals uncorrelated. The systems used are simple extensions to the digital case of the techniques known for the diversity reception of analog signals and are not devoid of inconveniences and restrictions.

One of these systems provides for the combination at the maximum power, i.e. the timing of the signals received and their subsequent addition, in order to maximize the signal/noise ratio of the combined signal. This system is not obviously capable of considering the distortion of the received signals which is a very important factor in multi-path propagation conditions. According to another technique, switching is provided on the antenna that in turn is receiving the signal at the highest power level.

The selection criterion can alternately be based on a quality estimate, but this requires a complete receiver for each antenna. The switching technique is also involving problems due to the switching transients which should be made to coincide with the inter-burst interval (i.e. between two subsequent bursts), considering also that the variation speed of the propagation conditions may be short as compared with the duration of the burst itself. Not even this technique may effectively allow for the distortion that the signal may show.

U.S. Pat. No. 4 328 585 discloses a receiver system for equalizing time-division digital signals received from a plurality of diversity channels or branches, providing for an estimate of the channel impulse response for each of the receiving branches, an adaptive matched filtering of each received signal, and the calculation of coefficients for the adaptive filtering and the equalizing of the received signals according to the adaptive filter technique, i.e. based upon the generation of an error signal and adaptive loops that lead to the convergence of the coefficients to optimum values.

SUMMARY OF THE INVENTION

In order to speed up the convergence process and to allow for a proper adapting to fast changes of the conditions of the transmission channel, this disclosure suggests a separation between the loops for the estimate of the adaptive filter coefficients and the loops for the estimate of the equalizer coefficients. On the contrary, the present invention is concerned with digital signals transmitted by burst in which a preamble sequence of known bits is provided for adapting the receiver to the transmission condition of that same burst. Such adapting has to be accomplished before starting to process the received burst which is quite short so that no technique of parameter estimation by means of adaptive loops could be used, whatever the speed of the process may be.

The purpose of this invention is to overcome the above mentioned restrictions and inconveniences of the known receivers and in particular to make an effective equalization possible, even when the signals received on the different antennae are subject to a high distortion.

These purposes are achieved through a first embodiment of the invention consisting in a process for equalizing time-division digital signals containing a preamble of known content in a digital radio mobile system in which the radio signals are received by at least two separate branches with associated antennas, the process comprising the steps of:

making an estimate of the channel impulse response for each of the receiving branches;

making adaptive matched filtering of each received signal;

calculating at least two weighting coefficients combining said received signals;

wherein said weighted coefficients are calculated as a function of the signal power levels received at each of said antennas and the reception quality signals of each channel representative of the estimate of distortion undergone by each channel and calculated with the aid of said received preamble; said estimate of the channel impulse response being also calculated with the aid of said received preamble;

the filtered signals from the said matched filtering are added together weighted by said coefficient to generate a combined signal, and the signals representing the transmission channel response in time to a single impulse of each channel are added together weighted by said coefficient to generate a control signal, whereby an estimate of the numerical sequence transmitted is obtained through an equalization of the combination signal by means of said control signal.

A second embodiment of the invention also consists of an adaptive receiver in space diversity for time-division digital signals in a digital radio mobile system in which the radio signals contain a preamble of known content, the receiver providing for at least two signal receiving and processing branches, not correlated, each comprising a branch matched filter and means for making an estimate of the channel impulse response for each of the receiving branches, and for means for making adaptive matched filtering of each received signal, wherein said estimating means comprises for each branch a register receiving a digitalized version of the received signals and connected to a unit which calculates the channel impulse response and is connected to a memory containing a copy of said preamble; and in that said receiver further comprises means for calculating weighted coefficients as a function of the signal power levels received at each of said antenna and of the reception quality signals of each channel representative of the estimate of distorsion undergone by each channel and calculated with the aid of said received preamble, a control signal as a sum, weighted by said coefficient, of the signal representing the transmission channel response in time to a single impulse of each channel;

means for calculating, a combined signal as the sum of said filtered signal weighted by said coefficient; and an equalizer receiving said combined signal and being controlled by said control signal. According to the above, the present invention determines not only the matched adaptive filter coefficients by processing such a preamble in order to generate the combined signal to be applied to the equalizer, but also the weighing coefficients used for generating the signal for controlling the equalizer. On the contrary, the device of U.S. Pat. No. 4 328 585 only produces a combined signal to be applied to the equalizer which has to determine by itself the working parameters in order to carry out the equalization.

Some further characteristics of the invention are the subject of the dependent claims.

BRIEF DESCRIPTION OF THE DRAWING

These and any further characteristics of the invention, as well as the relevant advantages, will result from the following specification of a preferred realization form, which is not restrictive as to the invention, shown in the attached drawings where.

DETAILED DESCRIPTION

Figure 1:
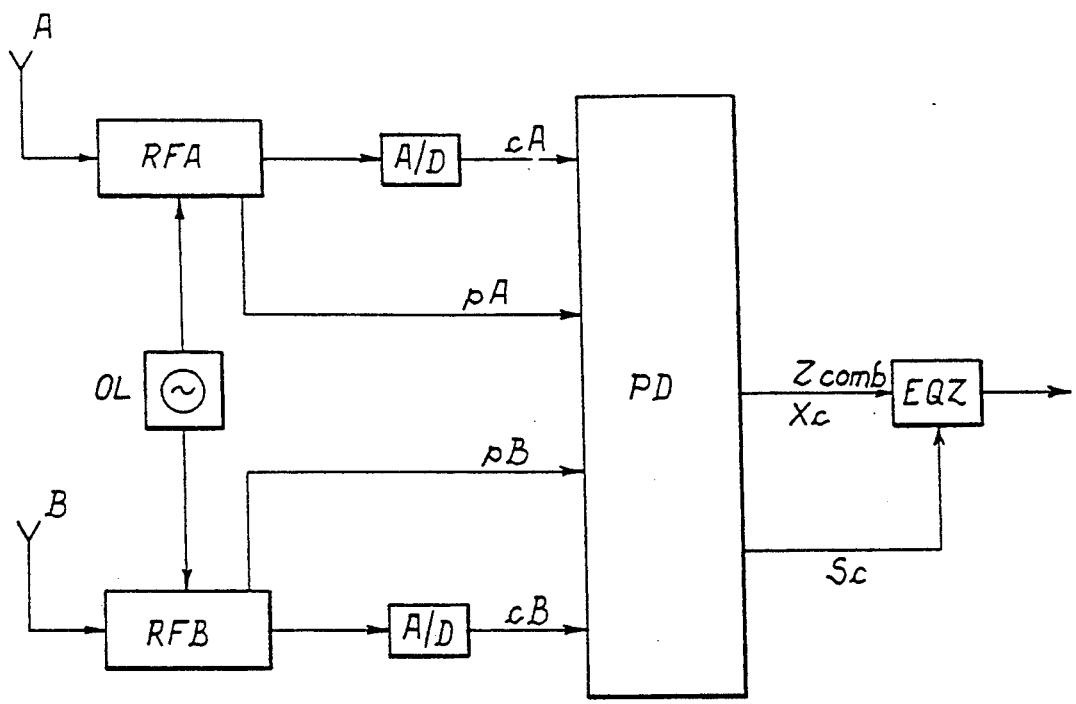
FIG. 1 shows a general block diagram of a receiver of the type using two antennae.

The receiver according to the invention is of the so-called space-diversity type. With reference to the figures, and in particular to FIG. 1, it contains two antennae, respectively A and B, located in positions far enough as to consider the signals thus received not correlated.

Figure 2:
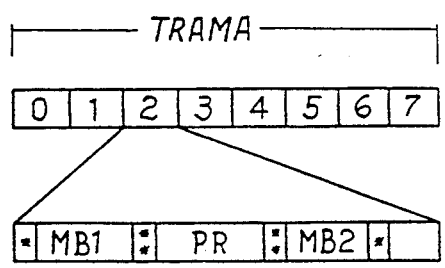
FIG. 2 shows schematically the structure of a TDMA frame.

The signal received by each antenna provides for a numeric modulation of a linear type or such as to be approximated in a linear form (therefore including the known modulations PSK, QAM, MSK, GMSK). Such signal also contains, as shown in FIG. 2, a frame formed by eight subsequent time slots (0–7), each containing a train or burst of bits relating to a conversation channel. Each conversation channel, as shown for instance for channel n. 2, is subdivided in two equal parts MB1 and MB2 separated by a preamble PR which is actually placed in an intermediate position. The contents of the preamble are known to the receiver and used l@or the estimate of the impulse response of the communication channel (CIR) and for the consequent variation of the correction parameters of a matched filter.

Antenna A is connected to a unit RFA including a front end receiver and a baseband converter, on the outlet of which an analog signal is available in the form of two orthogonal baseband components, which is sampled and converted in an 8 bit digital signal (cA) by an analog-digital A/D converter. One local oscillator OL provides one or more frequencies for the demodulation. A pA signal, representing the power level of the signal received by antenna A, is also drawn from unit RFA.

Figure 4:
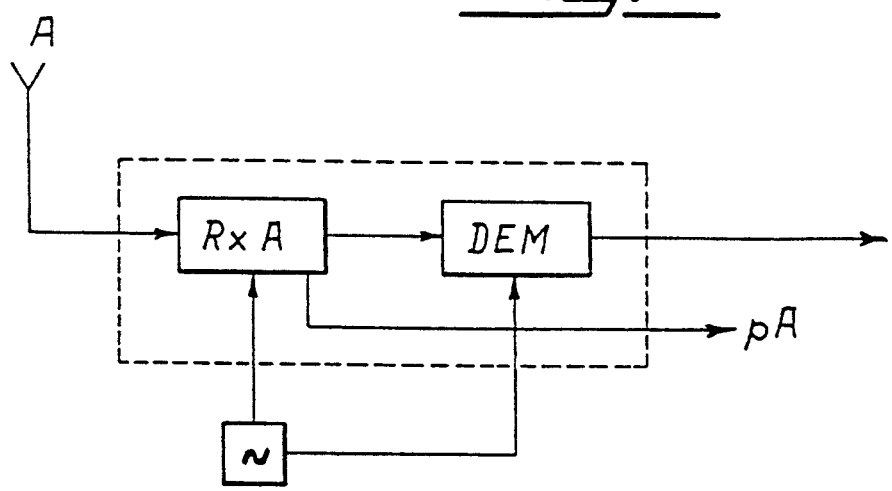
FIG. 4 shows a possible configuration of the front end receiver and of the baseband converter.

A possible form of implementation of unit RFA is shown in FIG. 4 and contains a radio frequency receiver stage marked by RxA that amplifies the signal and carries it to the input of a demodulator DEM of the coherent type.

Antenna B is associated to a similar signal processing chain, defined also as channel B, the components of which have been marked with the same references already used for chain A, and also identified if necessary with index B, which produce the corresponding signals cB and pB relating to antenna B.

The signals from the two A/D converters and the signals pA and pB are carried as input to a circuit PD producing two signals as output, respectively a first control signal Sc (containing information on the channel characteristics) and the combined signal Zcomb (containing the information transmitted).

The Zcomb signal is carried to an equalization element EQZ as input, with a subsequent estimate of the numerical sequence transmitted, consisting in a known way of a Viterbi processor or in case of another type of equalizer, such as for instance a transversal filter with decision feedback (DFE).

In addition to the Zcomb signal, a signal Sc is also applied to equalizer EQZ and supplies the information required to actuate, in a known way, the equalization functions themselves. These functions may be carried out through a Viterbi processor, the operating parameters of which are directly deducible, in a known way, from signal Sc. The equalizing element may be alternately implemented with other known techniques, for instance with a transversal filter with decision feedback (DFE), in which the tap gains are still deducible from the knowledge of Sc.

Figure 3:
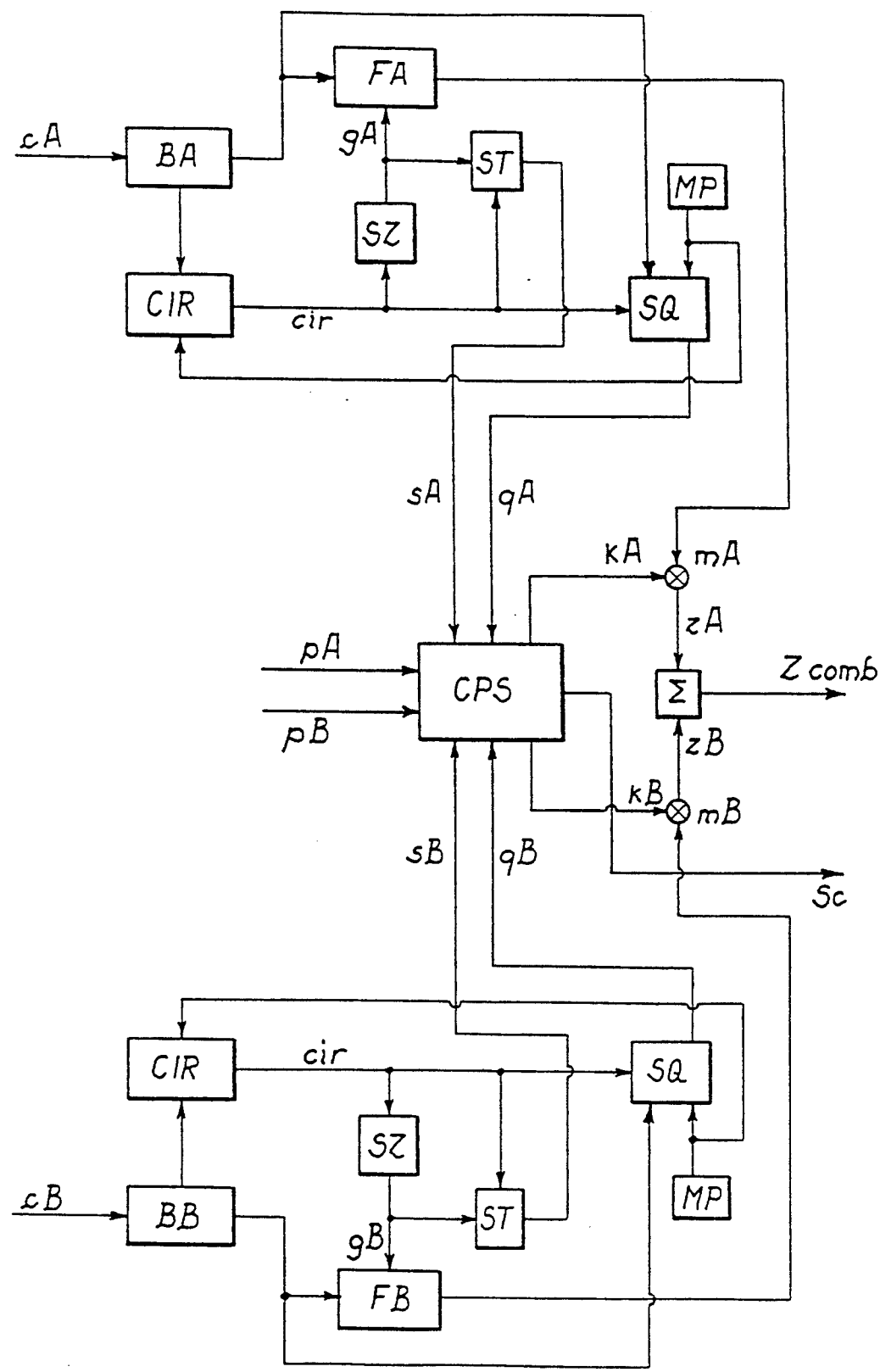
FIG. 3 shows the structure of unit PD in more details.

A preferred implementation of the PD circuit according to the invention will now be illustrated with reference to the diagram of FIG. 3.

The cA signal from the A/D converter of channel A is stored in a register of buffer BA. The samples of the preamble are extracted from buffer BA to be used for the. Channel Impulse Response (cir) estimate in the unit marked CIR, obtained in a known way with the known preamble sequence contained in MP storage.

The coefficients gA of a matched filter FA are obtained from the cir signal, through a sorter unit SZ. Moreover, cir and gA generate, in a first ST unit, an sA signal corresponding to the time response of the transmission channel to a single-impulse. Exactly ST calculates the convolution between the cir response and the gA samples.

Furthermore a signal qA, which is representative of the quality of reception, is also calculated. The quality signal qA may be evaluated in different ways, and may be based, for instance, on the correlation between signal received and known preamble sequence, and/or on the quadratic error between signal received and signal reconstructed according to the estimate itself. The calculation of the average quadratic error is made in a second SQ unit receiving as input the cir signal, the samples of message from buffer BA and the contents of a storage MP where the sequence of the preamble is contained. More exactly, SQ reconstructs the signal received, according to the estimated cir samples and the known preamble sequence, compares it with the corresponding part drawn from buffer BA and determines the deviation between them. The greater is the qA quality factor, the better is the estimate of the distortion undercone by the channel and therefore the better is the reconstruction that has been made of it.

Corresponding signals sB and qB are generated by channel B, which has a structure identical with that of channel A. Furthermore a processing circuit CPS is provided to receive:

the sA and sB signals from the two corresponding ST units, representative of the impulse response of channels A and B, respectively (therefore including the contribution due to the relating matched filters);

the quality factors qA and qB from the two corresponding SQ units; and the signals pA and pB, directly from the receiving stages RxA and RxB, representative of the power of the signal received by the antennae A and B, respectively.

Circuit CPS produces separately two weighing coefficients kA and kB, which are functions respectively of qA, pA and qB, pB, which are carried to the inputs of two multipliers mA and mB, respectively, which receive on the other inputs the outputs of FA and FB respectively, thus generating the weighed signals zA and zB.

Figure 5:
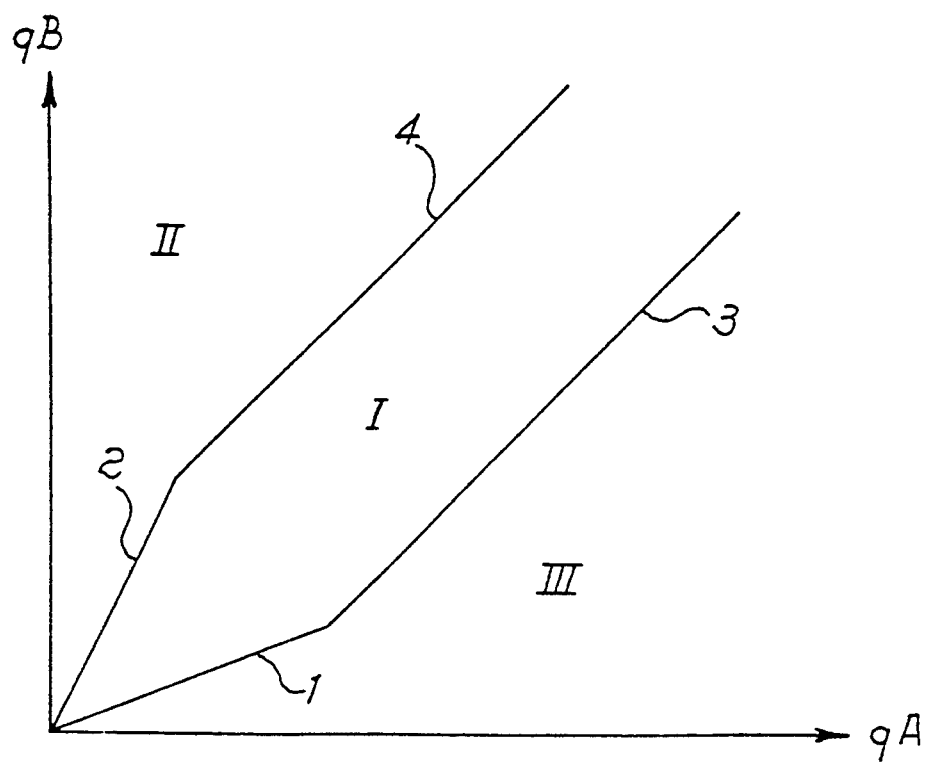
FIG. 5 shows a diagram for the determination of the weighing coefficients

The signal kA and kB are obtained with the following modalities, illustrated also with reference to the diagram of FIG. 5. The inputs pA, qA, pB and qB of the circuit CPS are used for forming the signals kA and kB according to the general formula:

$$(kA, kB) = f(pA, qA, pB, qB) \quad (i)$$

The regions I, II and III shown in FIG. 5 are delimited by the segments indicated by the following equations in the plane qA, qB:

1: $qB = qA \cdot H1$
2: $qB = qA \cdot (1/H1)$
3: $qB = qA - H2$
4: $qB = qA + H2$ where H1 and H2 are two such parameters that $0 < H1 < 1$ and $H2 > 0$.

The coordinates qA and qB determine in which of the regions I, II or III corresponds to the operating conditions and the calculation of the weighing coefficients kA and kB occurs with the following modalities:

in region I : $kA/kB = HP (pA/pB) + HQ (qA/qB)$
in region II : $kA = 0 \; kB = 1$
in region III: $kA = 1 \; kB = 0$ In the first instance HP and HQ are coefficients and the exact value of kA and kB (known their ratio) is defined by imposing a normalization constraint, such as for instance that $kA^2 + kB^2 = 1$. Having the weighing coefficients kA and kB known, circuit CPS also calculates the control signal Sc according to the relation:

$$Sc = kA \cdot sA + kB \cdot sB \quad (ii)$$

The signal zA and zB from multipliers mA and mB are then added in unit $\Sigma$, thus originating the combined signal Zcomb. That is unit $\Sigma$ calculates a combination of the two signals received, weighed as a function of the power with which the individual signals have been received and of the respective quality and distortion (parameters qA, sA and qB, sB generated by units ST and SQ).

Furthermore, as already mentioned, the weighing circuit CPS also generates a control signal Sc as output resulting from the weighed combination of sA and sB, with the same weighing coefficients kA and kB used to combine the outputs of FA and FB. As a consequence of it, signal Sc is representative of the response to the equivalent impulse in point Xc, so as it results from the weighed combination of the reception channels A and B. Although the invention has been described and illustrated with particular reference to a preferred form of implementation, it is understood that it extends to cover all obvious variations and changes that will appear evident to a person of ordinary skill in the art.

We claim:

1. In a digital radio mobile system in which radio signals having signal power levels are received by at least two separate branches with associated antennas, a process for equalizing time-division digital radio signals containing a preamble of known content, the process comprising the steps of:

(a) estimating a channel impulse response for each of the receiving branches based on said preamble;

(b) matched adaptive filtering each received signal producing filtered signals;

(c) calculating at lest two weighting coefficients as a function of the signal power levels received at each of said antennas and reception quality signals of each channel representative of an estimate of distortion undergone by each channel and calculated with the aid of said preamble;

(d) weighting said filtered signals with said weighting coefficients;

(e) adding the weighted filtered signals to generate a combined signal;

(f) weighting response time signals representing the transmission channel response time to a single impulse;

(g) adding the weighted response time signals to generate a control signal; and (h) estimating a numerical sequence contained in the radio signals transmitted through an equalization of the combination signal utilizing said control signal.

2. A process as claimed in claim 1, wherein said digital radio mobile system receives radio signals by only two branches.

3. Process according to claim 1 or 2, wherein the received signals are not correlated.

4. Process according to claim 1 or 2, wherein said matched filtering is implemented through a first transversal filter.

5. Process according to claim 1 or 2, wherein said equalization is implemented through a Maximum Likelihood Sequence Estimate implemented through the Viterbi algorithm.

6. Process according to claim 1 or 2, wherein said equalization is implemented through a second transversal filter with decision feedback.

7. In a digital radio mobile system in which transmitted radio signals containing a preamble of known content are received, an adaptive receiver for time-division digital signals comprising:

at least two signal receiving and processing circuit branches each including,
    a register receiving a digitalized signal derived from the transmitted radio signals,
    a branch adaptive matched filter, operatively connected to said register, producing a filtered signal from the stored digitalized signal,
    estimating means, operatively connected to said register, for estimating the channel impulse response, and
    a memory, connected to the estimating means, containing a copy of said preamble;
circuit means operatively connected to each branch, for calculating
    weighting coefficients, as a function of signal power levels of the received radio signals and of reception quality signals of each channel representative of the estimate of distortion undergone by each channel, the reception quality signals being a function of said preamble, and for calculating
    a control signal as a sum of weighted signals, the weighted signals being the signals representing a transmission channel response time to an impulse weighted by said weighting coefficients;
means for calculating a combined signal as the sum of each of said filtered signals weighted by said weighting coefficients; and
an equalizer receiving said combined signal and being controlled by said control signal.

8. An adaptive receiver as claimed in claim 7, comprising only two of said branches.

9. An adaptive receiver according to claim 7 or 8, wherein the branches are connected to at least one local oscillator supplying a frequency for the demodulation of the transmitted radio signals.

10. An adaptive receiver as claimed in claim 7 or 8, wherein the output of said estimating means is connected to the inputs of a selecting unit and of a convolution calculating unit a second input of the convolution calculating unit is connected to the output of said selecting unit, and an output of said convolution calculating unit is connected to said circuit means.

11. An adaptive receiver as claimed in claim 7 or 8, wherein an output of said estimating means is connected to the input of a signal rebuilding unit which in turn is connected to the output of said register and to the output of said memory, the output of said signal rebuilding unit being connected to said circuit means.

12. An adaptive receiver according to claim 7, wherein said equalizer contains a Viterbi processor.

13. An adaptive receiver according to claim 7, wherein said equalizer contains a transversal filter with decision feedback.

14. An adaptive receiver according to claim 12 or 13, wherein the antennas of each branch are connected to branch receivers, each receiver provided with an additional outlet connected to the circuit means.

15. In a receiver where radio signals are received from a transmission medium by at least two antennas and processed by at least two receiving branches, each receiving branch being associated with one antenna, a method for equalizing radio signals, comprising the steps of:

(a) converting the radio signal to a digital signal, in each receiving branch;

(b) filtering the digital signal, creating a filtered signal, in each receiving branch;

(c) estimating a quality of the digital signal in each receiving branch;

(d) calculating weighting values based on the estimated qualities of the digital signals of the receiving branches;

(e) weighting the filtered signal of each receiving branch with the weighting values;

(f) summing the weighted filtered signals creating a summed signal; and (g) equalizing the summed signal.

16. The method of claim 15, wherein the digital signals contain a known preamble and in each receiving branch step (c) includes:

(c1) extracting the known preamble from the digital signal;

(c2) retrieving from a memory an expected known preamble;

(c3) estimating the quality of the digital signal from the extracted known preamble and the expected known preamble.

17. The method of claim 16, wherein in each receiving branch step (c3) includes:

calculating an impulse response of the transmission medium and deriving the expected known preamble from the impulse response.

18. The method of claim 16, wherein in each receiving branch step (c3) includes:

calculating an impulse response of the transmission medium;

reconstructing the known preamble from the impulse response and the expected known preamble; and comparing the reconstructed known preamble with the extracted known preamble.

19. The method of claim 15, wherein step (d) includes:

(1) determining a ratio of the quality estimate of a first receiving branch to a quality estimates of receiving branches which are not the first receiving branch.

20. The method of claim 19, wherein step (d) further includes:
   (2) determining if the ratio is greater than a constant whose value is between 0 and 1.

21. The method of claim 15, wherein step (d) includes:
   (1) determining whether a quality estimate of a first receiving branch is greater than a quality estimates of receiving branches which are not the first receiving branch plus a positive constant.

22. The method of claim 15, wherein the radio signals have a signal power and the calculation of weighting values in step (d) is also based on the signal power of radio signals received at each receiving branch.

23. The method of claim 15 further including:
   (h) controlling the equalization of the summed signal with a calculated control signal.

24. The method of claim 23 wherein the calculated control signal is calculated as a function of the weighting values.

25. The method of claim 23 wherein the calculated control signal is calculated as a function of signals from each branch representing the time response of the transmission channel to a single impulse.

26. The method of claim 25 wherein the calculated control signal is also calculated as function of the weighting values.

27. In a radio receiver, a method for equalizing radio signals received from a transmission medium, each radio signal containing a preamble, comprising the steps of:
   extracting the preamble from the radio signal;
   retrieving from a memory a stored preamble;
   estimating an impulse response of the transmission medium from the extracted preamble and the stored preamble;
   reconstructing the preamble from the stored preamble and the impulse response;
   estimating the quality of the radio signal as a function of the reconstructed preamble and the extracted preamble;
   adapting the radio signal as a function of the estimated quality of the radio signal;
   equalizing the adapted radio signal.

* * * * *